United States Patent [19]
Dürrfeld et al.

[11] Patent Number: 5,445,658
[45] Date of Patent: Aug. 29, 1995

[54] GASIFICATION APPARATUS FOR A FINELY DIVIDED COMBUSTIBLE MATERIAL

[75] Inventors: Rainer Dürrfeld, Essen; Johannes Kowoll, Bochum; Eberhard Kuske; Hans Niermann, both of Essen; Gerhard Wilmer, Hattingen; Joachim Wolff, Essen, all of Germany

[73] Assignee: Krupp Koppers GmbH, Essen, Germany

[21] Appl. No.: 201,365

[22] Filed: Feb. 24, 1994

[30] Foreign Application Priority Data

Mar. 16, 1993 [EP] European Pat. Off. ............ 93104290

[51] Int. Cl.⁶ .............................. C01J 3/48; C01J 3/52; C01J 3/84; C01J 3/86
[52] U.S. Cl. .................................. 48/62 R; 48/67; 48/76; 48/77; 48/87; 48/128; 122/7 R
[58] Field of Search ............ 48/62 R, 63, 64, 67, 48/69, 76, 77, 87, DIG. 2, 197 R, 203, 128, 206, 210; 422/207; 122/7 R; 110/215, 235

[56] References Cited

U.S. PATENT DOCUMENTS

| | | | |
|---|---|---|---|
| 3,988,123 | 10/1976 | Coates | 48/77 |
| 4,013,427 | 3/1977 | Gernhardt et al. | 48/62 R |
| 4,272,255 | 6/1981 | Coates | 48/67 |
| 4,563,194 | 1/1986 | Simon | 48/67 |
| 4,610,697 | 9/1986 | Darling et al. | 48/69 |
| 4,671,806 | 6/1987 | Stil et al. | 48/77 |
| 4,731,097 | 3/1988 | Kohnen et al. | 48/87 |
| 4,768,470 | 9/1988 | Ziegler | 48/67 |
| 4,936,871 | 6/1990 | Wilmer et al. | 48/206 |
| 4,950,308 | 8/1990 | Lang et al. | 48/69 |
| 5,248,316 | 9/1993 | Peise et al. | 48/67 |

FOREIGN PATENT DOCUMENTS

| | | |
|---|---|---|
| 0115094 | 8/1984 | European Pat. Off. . |
| 2342079 | 6/1975 | Germany . |
| 61-235494 | 10/1986 | Japan ..................... 48/77 |

*Primary Examiner*—Peter Kratz
*Attorney, Agent, or Firm*—Michael J. Striker

[57] ABSTRACT

The gasification apparatus for gasification of finely divided combustible material under pressure includes a gasification reactor which produces a crude gas, a quenching pipe and a convection-heated boiler with a boiler housing, all mounted inside a pressurized vessel. A gas flow guiding device is provided above the quenching pipe for conducting a mixed gas flow containing the crude gas and a quenching gas from the quenching pipe into the convection-heated boiler which surrounds the quenching pipe concentrically. A gas outlet device is provided for the gas flow from the convection-heated boiler and from the pressurized vessel. The gasification reactor is supported at its bottom end in the pressurized vessel at anchoring points. The convection-heated surface elements of the convection-heated boiler are supported by the quenching pipe and the boiler housing but in a stress-free manner. A quenching gas inlet device is provided and includes a circumferential gap between an inlet section of the quenching pipe and an adjacent outlet section of the gasification reactor through which a quenching gas is conducted to form, together with the crude gas, the mixed gas flow.

10 Claims, 7 Drawing Sheets

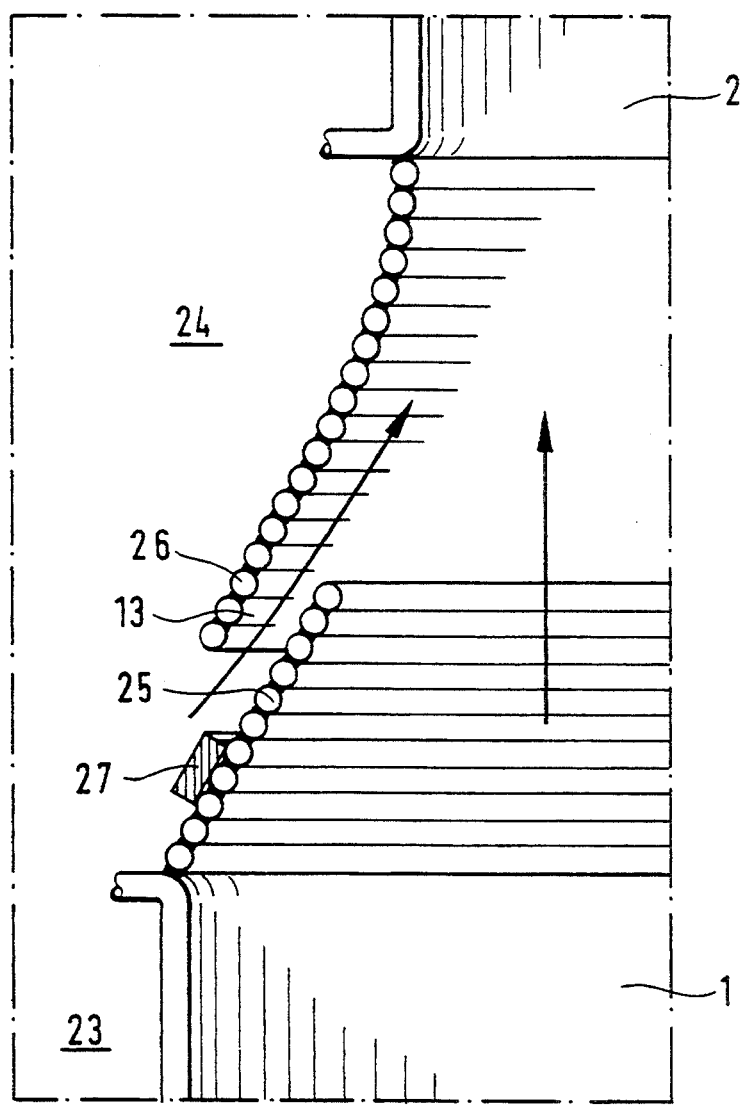

5,445,658

GASIFICATION APPARATUS FOR A FINELY DIVIDED COMBUSTIBLE MATERIAL

BACKGROUND OF THE INVENTION

The invention relates to an apparatus for pressure gasification of a finely divided combustible material.

A gasification apparatus for a pressure gasification is known including a gasification reactor, a quenching pipe for crude gas issuing from the gasification reactor and a convection-heated boiler with convection heating surface elements for receiving the heat from the crude gas.

Finely divided combustible material means fine grained to dust-like combustible material. Particularly this material can be a fuel such as coal. The energy is supplied to the gasification reactor by burner, which also entrains predominantly the finely divided combustible material. The gasification reaction is controlled in regard to thermodynamic considerations so that a commercially useful gas of a predetermined composition is produced. Reactions are frozen, so to speak, in the quenching pipe by chilling. Furthermore a quenching gas is admitted to the quenching pipe. The expression "gas" also mean "vapor" in the scope of the present invention. The invention provides apparatus for a pressure gasification of finely divided combustible material in a single stage.

In a gasification apparatus of the above-described type the walls of the gasification reactor, the quenching pipe and the convection-heated boiler and other components are provided with pipe walls made from welded parallel pipes or with pipes for the purpose of high-temperature liquid cooling, e.g. in the form of boiling water cooling. This is also true in the apparatus according to the invention. It is understood that the heat received by the pipe walls is utilized in the process performed in the apparatus.

In the known gasification apparatus, on which the invention is based and which is described in European Patent Document 0 115 094 A2, the gasification apparatus includes a first tower-like structure in a first pressurized vessel containing a gasification reactor with a quenching pipe. Behind the quenching zone the quenching pipe acts as a radiant heat boiler and can be provided with corresponding heat radiating surfaces. The convection boiler is formed by a second tower-like structure in a second pressurized vessel. The pressurized vessel can be cooled. Both tower-like structures are connected at their top ends by a cooled connecting duct, through which a crude gas issues from the quenching pipe or radiant heat boiler into the convection-heated boiler. The connecting duct is designed as a thermal expansion compensating device or is provided with such a device. That is expensive and requires expensive features for feeding and delivering quenching gas and heat carriers in the pipe walls of the quenching pipe, the radiant heat boiler and the convection-heated boiler. The apparatus is divided into two structures because of thermodynamic reasons, while the apparatus in both structures operates at different temperature ranges and different thermal expansions. As a result a comparatively large structural volume with suitable mass is required for a certain output of commercial gas produced. The structural volume/output relationship of the prior art required considerable improvement.

SUMMARY OF THE INVENTION

It is an object of the present invention to provide a gasification apparatus for gasification of a finely-divided combustible material under pressure to form a commercially useable gas in a single step, which has a comparatively high output and by which the structural volume/output relationship is considerably improved without the additional disadvantages of the prior art based on thermodynamic considerations.

According to the invention, the gasification apparatus for a gasification of a finely divided combustible material under pressure to form a product gas in a single stage, comprises a gasification reactor from which a crude gas issues during a gasification of the finely divided combustible material under pressure; a quenching pipe positioned above the gasification reactor for receiving the crude gas issuing from the gasification reactor and for guiding a gas flow comprising the crude gas; a convection-heated boiler having boiler housing and convection-heated surface elements for receiving heat transferred from the gas flow, the surface elements being supported by and surrounding the quenching pipe and the boiler housing; a pressurized vessel in which the gasification reactor, the quenching pipe and the convection-heated boiler are located, the pressurized vessel surrounding concentrically the quenching pipe and the gasification reactor being supported at anchoring points in a lower portion of the pressurized vessel so as to be coaxial to the quenching pipe; gas flow guide means for conducting the gas flow into the convection-heated boiler from the quenching pipe, the gas guide means being accommodated in a portion of the boiler housing extending above the quenching pipe; gas outlet device located between the gasification reactor and the convection boiler, through which the gas flow is conducted from the boiler housing and from the pressurized vessel; load bearing members above the gas outlet device on which the quenching pipe and the boiler housing are supported, the load bearing members having gas conducting openings and being supported at other anchoring points on the pressurized vessel; and quenching gas guide means for conducting a quenching gas into the quenching pipe to form a mixed gas flow including both the crude gas and the quenching gas, the quenching gas guide means including a circumferential quenching gas inlet gap between the gasification reactor and the quenching pipe dimensioned so as to provide a circumferential thermal expansion compensating gap, so that a portion of the quenching pipe under the load bearing members and a section of the gasification reactor above the anchoring points can have different thermal expansion properties. In this way the gasification apparatus according to the invention is a one-piece structure. The pressurized vessel is of course designed for the pressure at which the pressure gasification is performed. The entire load of the quenching pipe, the boiler housing and the convection heated surface elements is borne by the load bearing members.

A gasification apparatus for gasification of finely divided combustible material to form a commercially useable gas in a single stage, which is a one-piece structure, is described in German Patent 23 42 079, 1973. A quenching device of reduced structural height and a radiant heat boiler connected to it are located at the crude gas outlet of the gasification reactor. The crude gas passes upwardly flowing heated surfaces of a water preheater and issues from the top of the pressurized vessel. This gasification apparatus does not provide the output that is required in modern engineering applications. Thermal expansion problems are not properly handled.

The invention is based on the knowledge that the quenching pipe can be put in the convection-heated boiler and this unit can be integrated with the gasification reactor in the pressurized vessel to form a single structural unit, without introducing disadvantages of the prior art based on thermodynamic considerations. In contrast in the apparatus according to the invention the process heat is used in an efficient manner. Comparatively large convection heated surface elements can be accommodated in the hollow cylinder convection-heated boiler, also in so-called independant bundles one above the other, so that the bundles are supported on the quenching pipe and the boiler housing in a stress free manner. Of course a comparatively large thermal expansion of the quenching pipe occurs, because of the action of the hot crude gas on the interior and exterior, which results however in no static forces on the structure integrated in the manner of the invention, because of the support of the gasification reactor at the fixed anchoring points on the pressurized vessel and the formation of the quenching gas inlet gap simultaneously as a thermal expansion gap.

There are several preferred embodiments of the invention. The pressurized vessel acts advantageously as a supporting means for the gasification reactor. Thus the quenching pipe and the convection-heated boiler with the boiler housing can be stationary and stable. The apparatus can be designed so that the pressurized vessel only bears the stresses and strains and is supported by a suitable framework, for its part, to which the stresses and strains are transmitted. The structure of the quenching pipe in the convection-heated boiler according to the invention is such that boiler dirt, which could impair the thermodynamics of the convection-heated boiler, cannot occur. Furthermore the gas guide means can be formed as a dome-like gas conductive device. Because of that, the gas is conducted about a 180° turn and the gas conducting device is highly symmetric with an axis of symmtry for rotation about 180°. The apparatus has a gas outlet device for the discharge of cinder and ash particles.

In a preferred embodiment the gasification reactor is supported on brackets of the pressurized vessel at its bottom region. Generally the convection heated surface elements are supported on one end on supporting crosspieces. Advantageously the convection heated surface elements are hung on the supporting crosspieces. The crosspieces, for their part, are supported on the boiler housing and the quenching pipe and of course are supported free of strains. Different thermal expansion of the boiler housing and the quenching pipe then does not lead to bending stresses and forces on the supporting crosspieces, which can be slightly tilted as a result of the different thermal expansion. The connecting pipe sections are accordingly elastically deformable for compensate for thermal expansion. The load bearing members used in the apparatus according to the invention can be structured in different ways. They continuously bear the entire load of the quenching pipe, the boiler housing and the convection surface elements. Advantageously according to a preferred embodiment of the invention the load bearing member is a rigid metal component comprising an inner ring, an outer ring and a plurality of spokes connecting the inner and outer rings. The intervening spaces between the spokes comprise gas conducting openings. The inner ring, outer ring and spokes can be formed in one-piece as a single structural component. So as to avoid or minimize forces or stresses resulting from differing thermal expansions of different components in this region of the apparatus, the load bearing members are connected to load receiving elements in the pressurized container or vessel by a heated support or a heated frame at the boiler housing.

A high-temperature cooling of the pipe walls of the quenching pipe can be performed in a very simple way according to the invention, and indeed so that the load bearing members can be simultaneously used as feed or supply devices for boiling water of a boiling water cooling of the quenching pipe-forming connected pipes.

The described anchoring point supports are essential in the apparatus according to the invention. The support of the load bearing members in the pressurized vessel is accomplished without any problems even with large thermal expansion, when all the connecting pipes between the quenching pipe and the boiler housing are formed so as to be elastically deformable by thermal expansion. Particularly it is especially advantageous when the boiling water is conducted away from the quenching pipe by upwardly extending thermal expansion-deformable boiling water discharge pipes connected to the quenching pipe.

In the gasification apparatus according to the invention the quenching gas can be conducted to the quenching gas inlet gap in a very simple, reliable manner. According to the invention the gasification reactor forms a circular space between itself and the wall of the pressurization vessel and the quenching gas is fed to the quenching gas inlet gap through this circular space. The circular space is connected also with a pressure balancing space, which is located between the boiler housing and the pressurized vessel wall. The boiler housing is thus not under pressure, because of this structure. In a preferred embodiment the quenching gas inlet gap is formed between a frustrum-like outlet section of the gasification reactor and a complementary skirt of the quenching pipe which forms an inlet section of the quenching pipe. The outlet section of the gasification reactor is free of fire-resistant lining in contrast to the prior art apparatus. Not only is a fire-resistant lining not provided, but also this structural element is bare metal. The cone angle to the horizontal of the frustrum-like outer section is about 60°. The outer section of the gasification reactor is appropriately provided with a cleaning ring, which periodically is movable, e.g. by a clopping device, for the purposes of removing poossibly adhering ash particles.

The advantages of the invention are that the one-piece gasification apparatus provides as high an output as a prior art apparatus consisting of two independent structural units, which are connected with each other by a connecting duct and it has a considerably improved structural volume to output relationship without introducing any of the disadvantages resulting from thermodynamic considerations.

BRIEF DESCRIPTION OF THE DRAWING

The objects, features and advantages of the present invention will now be illustrated in more detail by the following detailed description, reference being made to the accompanying drawing in which:

FIG. 7 is a detailed cutaway cross-sectional view of the region F of the gasification apparatus of FIG. 1.

DESCRIPTION OF THE PREFERRED EMBODIMENT

Figure 1:
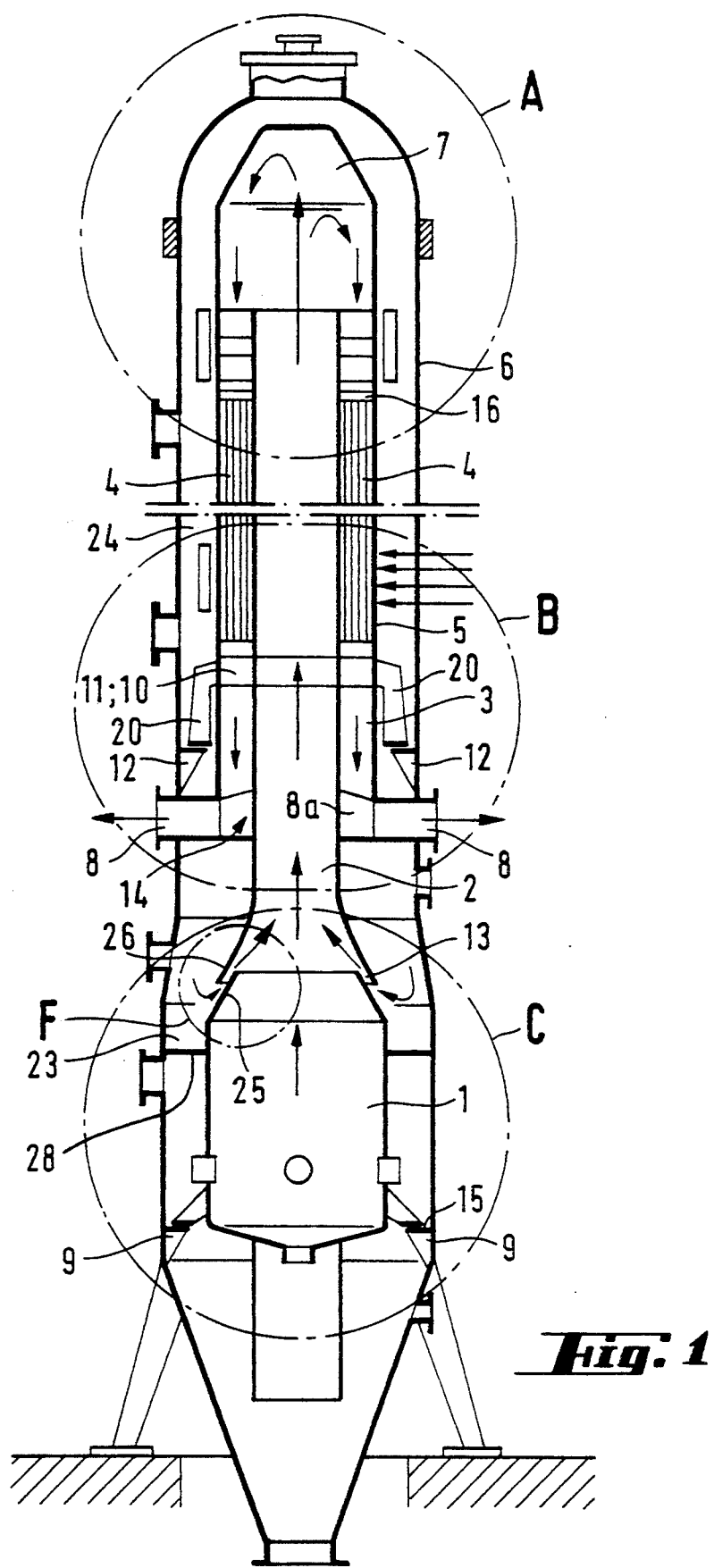
FIG. 1 is a vertical cross-sectional view through a gasification apparatus according to the invention.

The gasification apparatus shown in the drawing is equipped and designed for the pressure gasification of a finely divided combustible gas to produce a commercially useable product gas in a single operation. A middle section, whose length corresponds approximately to the length of the illustrated lower section, is not shown in FIG. 1.

This gasification apparatus consists essentially of a gasification reactor 1, a quenching pipe 2 for the crude gas issuing from the gasification reactor and a convection-heated boiler 3 with convection heated surface elements 4 for receiving heat of the gas flow. The convection heated surface elements 4 are arranged to form concentric cylinders. As already mentioned the described apparatuses comprise pipe walls formed from pipes or pipe sections welded together, which, for their part, extend parallel to each other.

Figure 2:
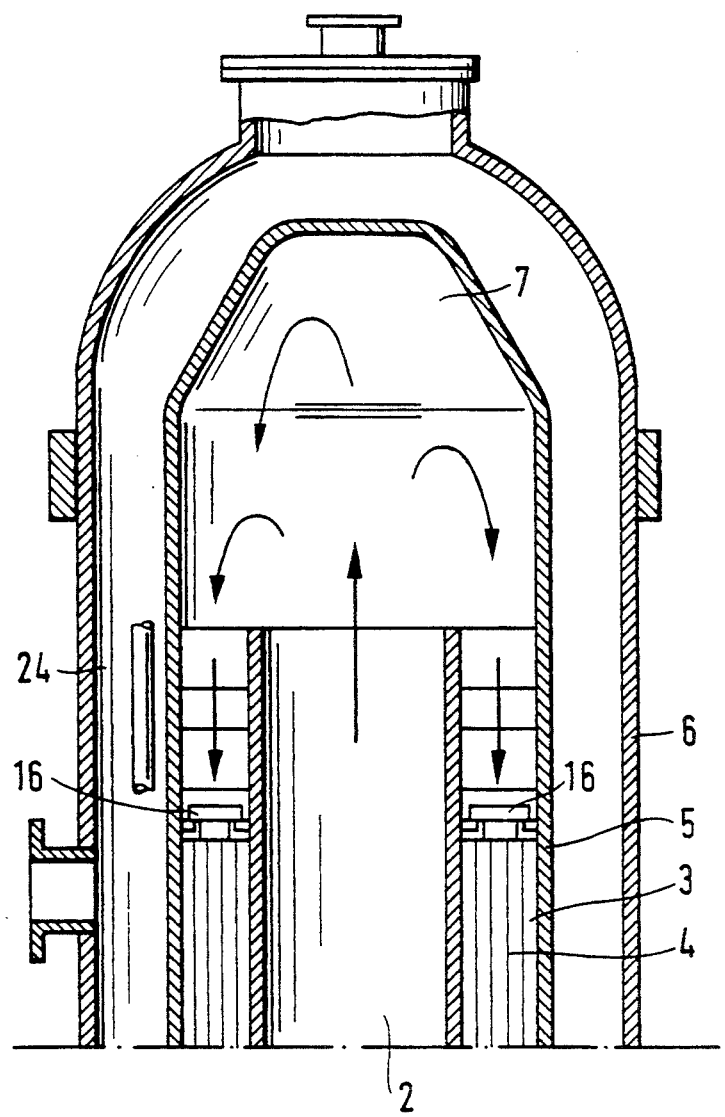
FIG. 2 is a detailed cutaway cross-sectional view of a top portion A of the gasification apparatus of FIG. 1.

The gasification reactor 1, the quenching pipe 2 and the convection-heated boiler 3 with its boiler housing 5 are arranged in a pressurized vessel 6. The convection-heated boiler 3 surrounds the quenching pipe 2 concentrically. The gasification rector 1 is coaxial to and under the quenching pipe 2. Also the boiler housing 5 is advantageously made from pipe walls. One observes-in the upper portion of the apparatus shown in FIGS. 1 and 2 that a group of convection heated surface elements 4 are suspended on the quenching pipe 2 and in the boiler housing 5. In the same way additional bundles or groups of convection heated surface elements can be arranged and distributed over the entire height of the gasification apparatus.

Figure 3:
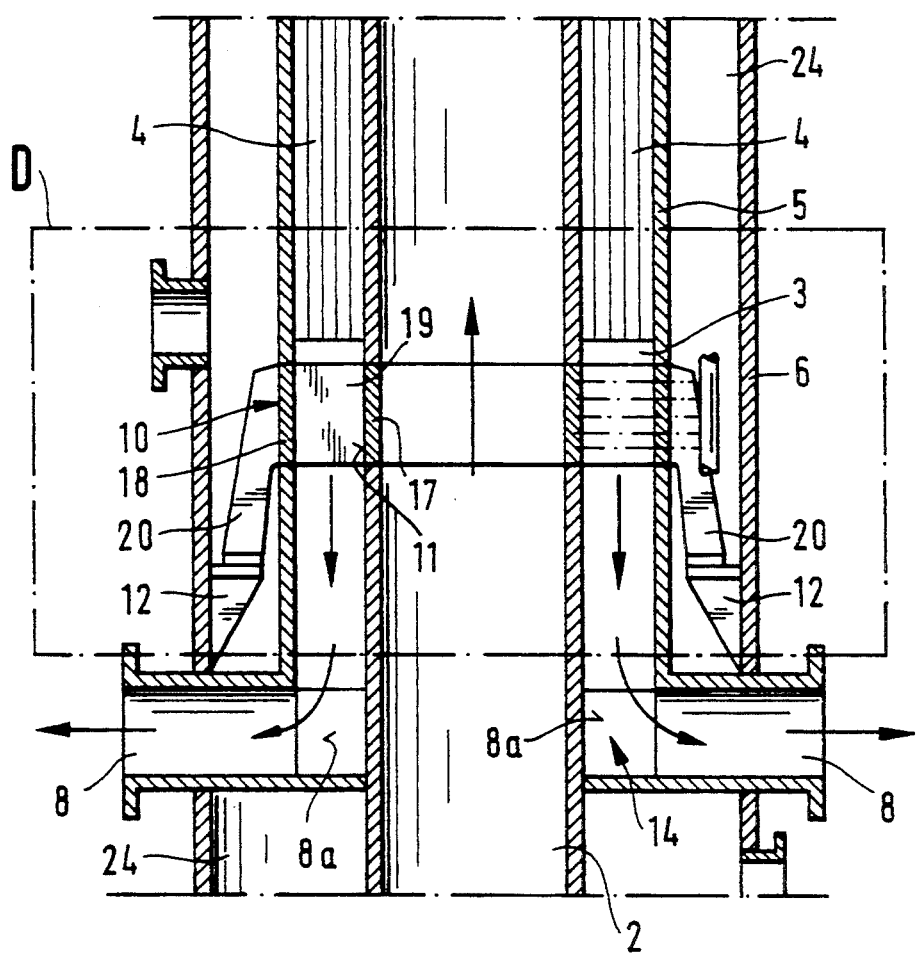
FIG. 3 is a detailed cutaway cross-sectional view of a middle portion B of the gasification apparatus of FIG. 1.

A gas flow guide means 7 for a mixed gas flow including the crude gas and added quenching gas, which issues from the quenching pipe 2 and is conducted into the convection-heated boiler 3, is mounted above the quenching pipe 2 in the boiler housing 5. This gas guide means 7 is shown particularly in FIG. 2. Especially as seen in FIG. 3, a gas outlet device 8 is provided for the convection-heated boiler 3 in the region between gasification reactor 1 and the convection-heated boiler 3, with which the crude gas is guided from the boiler housing 5 and the pressurized vessel 6. The curved flow of the gas issuing from the convection-heated boiler 3 results from a guiding provided with the help of a mechanism 14 for discharge of cinders and/or ash particles, this mechanism 14 including particularly the vane elements 8a. The design is such that troublesome cinders and ash particles travel with the gas flow and are not deposited on apparatus surfaces. The cooling of the gas flow and thus the cinder particles is conducted to such an extent that baking on of these cinders is not possible.

The gasification reactor 1 is supported in the lower portion of the pressurized vessel 6 at the anchoring points 9.

The convection heated surface elements 4 are supported by the quenching pipe 2 and the boiler housing 5. The quenching pipe 2 and the boiler housing 5 are mounted with their bottom portion on load bearing members 10 above the gas outlet device 8. The load bearing members 10 have gas conducting openings 11 and are supported on the pressurized vessel 6. The load bearing members 10 are secured to the pressurized vessel 6 at the other anchoring points 12 as shown particularly in FIG. 3, 5 and 6.

Figure 4:
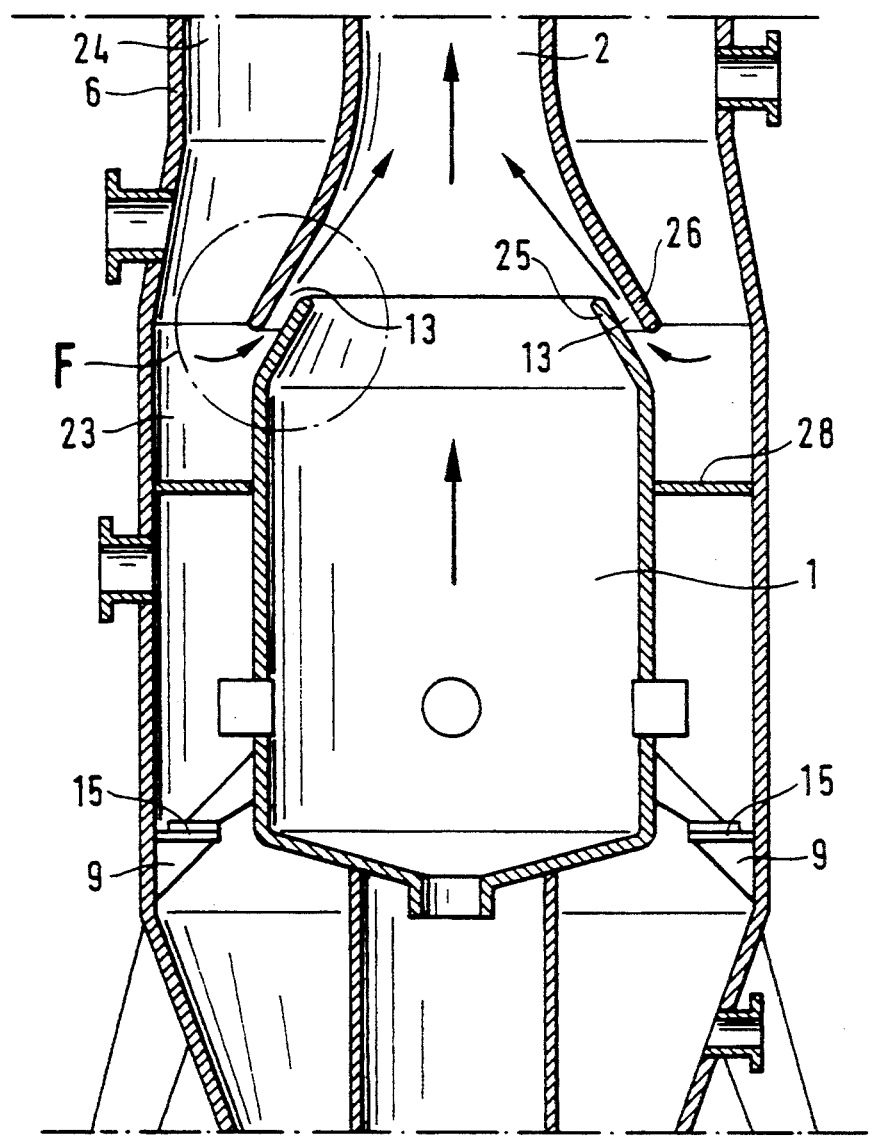
FIG. 4 is a detailed cutaway cross-sectional view of a bottom portion C of the gasification apparatus of FIG. 1.

Particularly from FIG. 4, one sees that a quenching gas guide means is provided between the gasification reactor 1 and the quenching pipe 2, which comprises a quenching gas inlet gap 13 between the quenching pipe 2 and the gasification reactor 1. The gap 13 separates the quenching pipe 2 and the gasification reactor 1. This arrangement compensates for different thermal expansion rates of the section of the gasification reactor 1 above the anchoring points 9 and of the portion of the quenching pipe below the load bearing members 10. Thus the quenching gas inlet gap 13 is also dimensioned as a thermal expansion compensating gap.

In the embodiment of the invention shown in the drawing the pressurized vessel 6 is simultaneously a supporting means for the gasification reactor 1, the quenching pipe 2 and the convection-heated boiler 3 with the boiler housing 5 and is both stationary and stable. The above-described gas guide means 7 is a dome-like gas conducting device.

The gasification reactor 1 is supported on the brackets 15 attached to the pressurized vessel 6 in its lower part as seen in FIG. 4.

The convection heated surface elements 4 are attached on one end to the supporting crosspieces 16. The crosspieces 16 are connected to the quenching pipe 2 and to the boiler housing 5 in a stress-free manner to avoid stresses in the boiler housing and/or the quenching pipe arising from differing thermal expansion rates.

Figure 5:
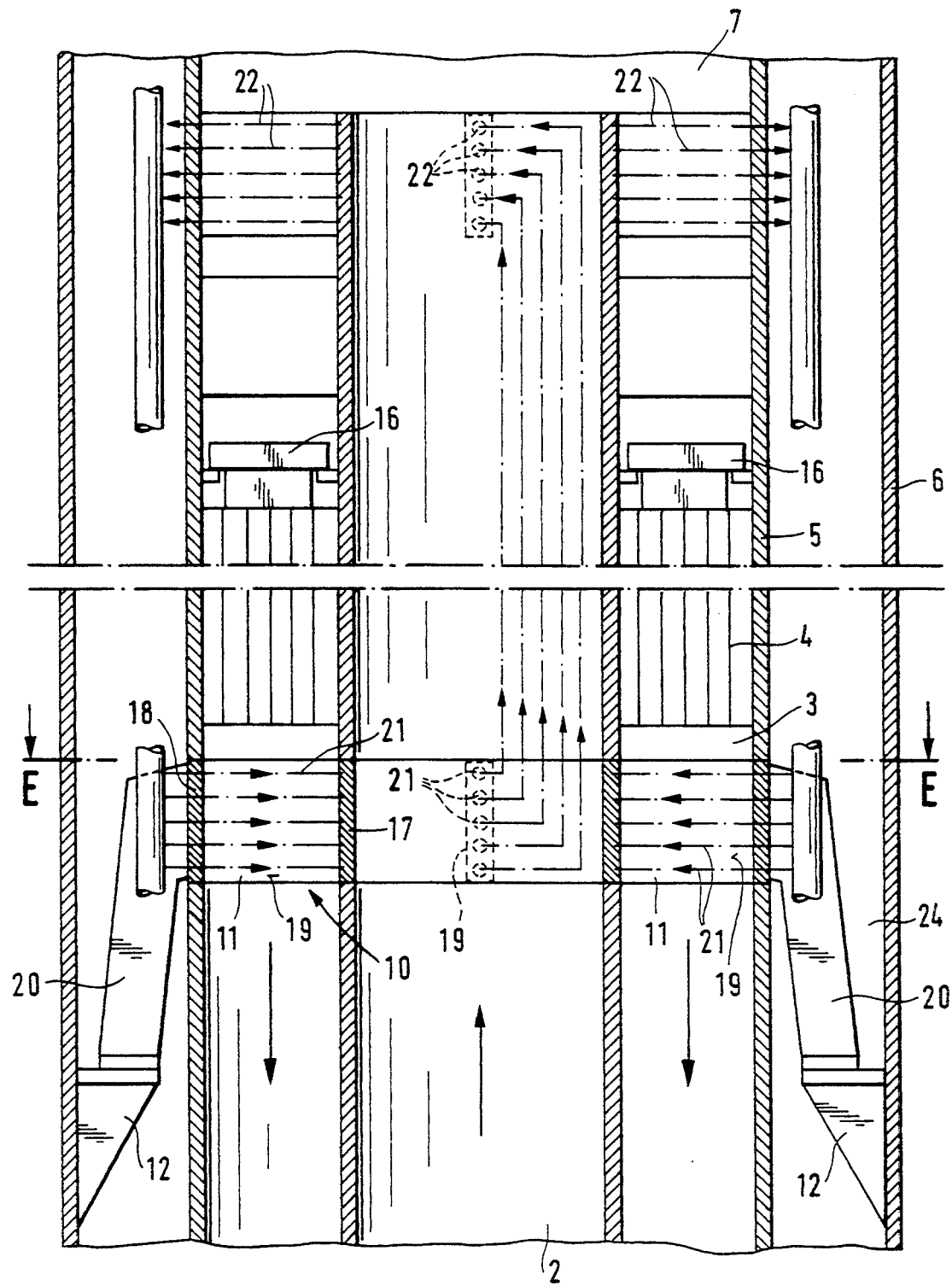
FIG. 5 is a detailed cutaway cross-sectional view of a portion D of the gasification apparatus of FIG. 3.
Figure 6:
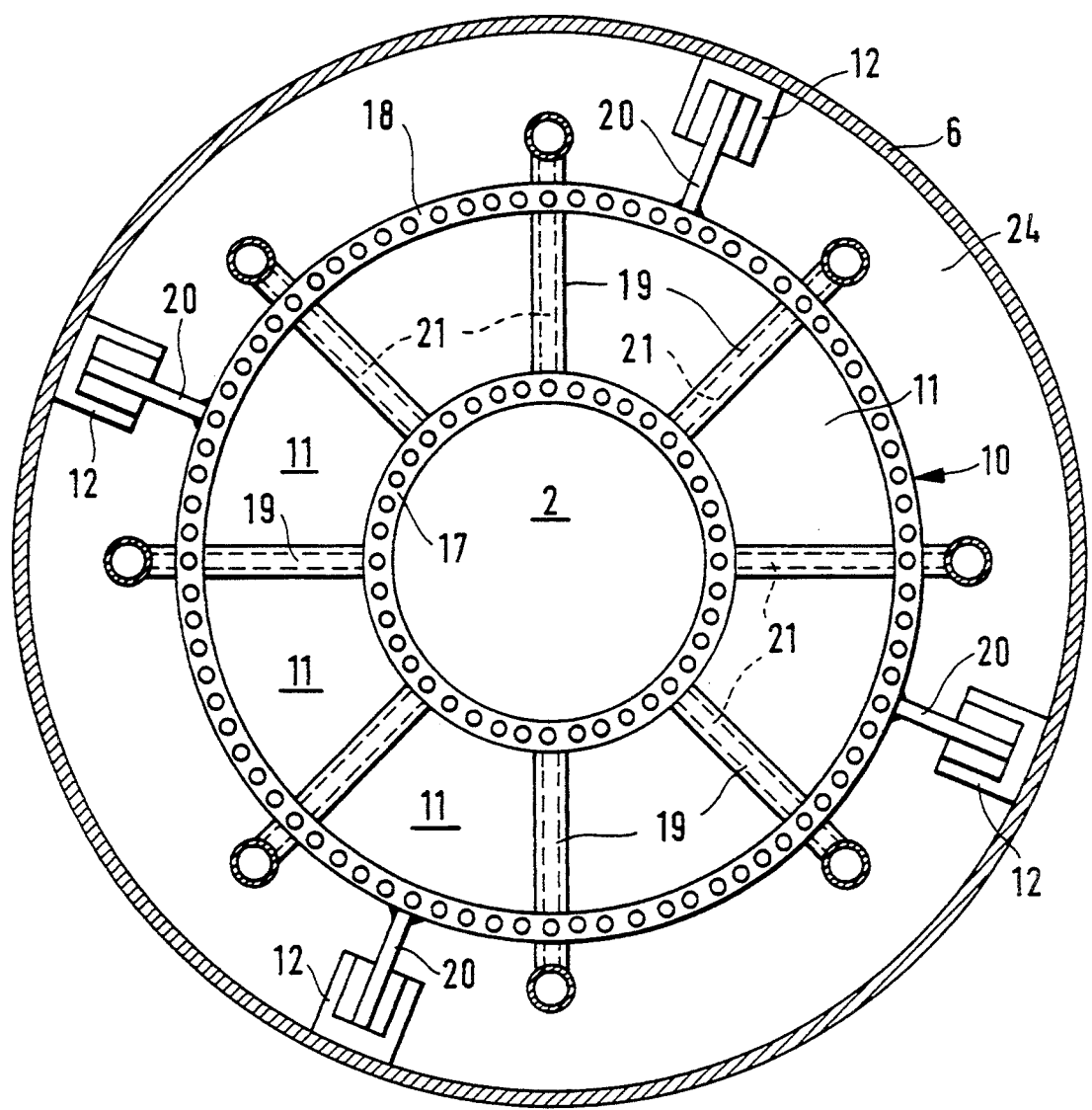
FIG. 6 is a detailed cutaway horizontal cross-sectional view of the gasification apparatus taken along the section line E—E of FIG. 5.

The individual components of the load bearing members 10 are seen in FIGS. 5 and 6. These components include the rigid, metallic member comprising an inner ring 17, an outer ring 18 and spokes 19 connecting the inner ring 17 and the outer ring 18. The intervening space between the spokes 19 form the gas conducting openings 11. The components 17, 18 and 19 described above form a single piece, e.g. a forged piece. The load bearing members 10 are connected to the load receiving portions of the pressurized vessel 6 by heated supporting members or a heated frame 20 on the boiler housing 5. The load bearing members 10 simultaneously comprise means for conducting the boiling water of the boiling water cooling of the quenching pipe-shaped pipe ducts of the pipe wall of the quenching pipe 2 as shown in FIG. 5. The pipe ducts 21 are shown in FIG. 5. The boiling water is conducted away over thermally expandable discharge pipes 22 connected to the quenching pipe 2 and/or its pipe ducts 21. All pipe connections between the quenching pipe 2 and the boiler housing 5 are designed and arranged to be elastically deformable during thermal expansion, apart from the pipe ducts to and in the load bearing members 10.

The gasification reactor 1 forms a circular space 23 between itself and the opposing wall of the pressurized vessel 6. The supplied quenching gases are guided through this circular space 23 to the quenching gas inlet gap 13. The circular space 23 is moreover connected with a pressure equalizing space 24, which is open between the boiler housing 5 and the walls of the pressurized vessel 6.

The quenching gas inlet gap 13 is advantageously formed in a special way in the embodiment shown in FIG. 7. The quenching gas inlet gap 13 is formed between a frustrum-like outlet section 25 of the gasification reactor 1 and a complementary skirt 26 of the quenching pipe 2. The outlet section 25 on the gasification reactor side is made from blank metal free of any fire-resistant lining. The cone angle of the frustrum amounts to about 60°. All downstream surfaces of the outlet section 25 are similarly free of fire-resistant coating. The outlet section 25 of the gasification reactor 1 is provided with a cleaning ring 27 and is movable periodically, e.g. with a clopping device.

To guarantee a clear flow direction for the quenching gas through the gap 13, the circular space between the circumferential wall of the gasification reactor 1 and the pressurized vessel 6 is closed by a membrane 28. The pressure balancing in the region under the membrane 28 occurs via cinder outlet openings in the base of the gasification reactor 1.

While the invention has been illustrated and described as embodied in an apparatus for gasification of a finely divided combustible material under pressure, it is not intended to be limited to the details shown above, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Gasification apparatus for gasification of a finely divided combustible material under pressure to make a product gas in a single operation, the gasification apparatus comprising
   a gasification reactor having an outlet section from which a crude gas issues during a gasification of the finely divided combustible material;
   a quenching pipe positioned above the gasification reactor for receiving the crude gas issuing from the gasification reactor and for guiding a gas flow including the crude gas, the quenching pipe having an inlet section for receiving the crude gas;
   a convection-heated boiler including a boiler housing and convection-heated surface elements for receiving heat transferred from the gas flow, the convection-heated surface elements being supported by the quenching pipe and the boiler housing and the convection-heated surface elements and the boiler housing surrounding the quenching pipe;
   a pressurized vessel containing the gasification reactor, the quenching pipe and the convection-heated boiler, the pressurized vessel surrounding concentrically the quenching pipe and the gasification reactor being supported at anchoring points in a lower portion of the pressurized vessel so as to be coaxial to the quenching pipe;
   gas flow guide means for conducting said gas flow into the convection-heated boiler from the quenching pipe, the gas flow guide means being accommodated in a portion of the boiler housing extending above the quenching pipe and the gas flow guide means connecting said quenching pipe and said convection-heated boiler so that the gas flow is conducted through the convection-heated boiler from the quenching pipe by the gas flow guide means;
   a gas outlet device located between the gasification reactor and the convection-heated boiler, through which the gas flow is conducted from said boiler housing and from said pressurized vessel;
   load bearing members above the gas outlet device on which the quenching pipe and the boiler housing are supported, the load bearing members being provided with gas conducting openings and being supported at other anchoring points on the pressurized vessel; and
   quenching gas guide means for conducting a quenching gas into said quenching pipe to form the gas flow including the crude gas and the quenching gas, the quenching gas guide means including a circumferential quenching gas inlet gap between the outlet section of the gasification reactor and the inlet section of the quenching pipe dimensioned to provide a circumferential thermal expansion compensating gap, so that a portion of the quenching pipe under the load bearing members and a portion of the gasification reactor above the anchoring points of the gasification reactor can have different thermal expansion properties.

2. Gasification apparatus as defined in claim 1, wherein the pressurized vessel acting as a supporting means for the gasification reactor, the quenching pipe and the convection-heated boiler with the boiler housing is stationary and stable.

3. Gasification apparatus as defined in claim 1, wherein the gas flow guide means comprises a dome-like gas conducting device.

4. Gasification apparatus as defined in claim 1, wherein the gas outlet device has means for conducting away cinders and ash particles from said convection-heated boiler, said means for conducting away cinders and ash particles including vane elements for guiding said gas flow.

5. Gasification apparatus as defined in claim 1, wherein the gasification reactor is supported in a lower region thereof on brackets connected to the pressurized vessel.

6. Gasification apparatus as defined in claim 1, further comprising supporting crosspieces in the pressurized vessel and wherein the convection heated surface elements are attached at one end to the supporting crosspieces.

7. Gasification apparatus as defined in claim 6, wherein the crosspieces are connected in a stress-free manner to the boiler housing and the quenching pipe.

8. Gasification apparatus as defined in claim 1, wherein the load bearing members comprise a rigid metallic component consisting of an inner ring, an outer ring and a plurality of spokes connecting the inner ring and the outer ring so as to form intervening spaces between the spokes through which said gas flow can pass.

9. Gasification apparatus as defined in claim 1, wherein the gasification reactor is dimensioned and spaced from a wall of the pressurized container so as to form a circular space between the gasification reactor and said wall of said pressurized container and said circular space is formed so that a quenching gas can flow through said circular space to said quenching gas inlet gap and the quenching pipe is dimensioned and spaced from said wall of said pressurized container to form a pressure balancing or compensation space between said wall of said pressurized container and said quenching pipe.

10. Gasification apparatus as defined in claim 1, wherein the outlet section of the gasification reactor is a frustrum-shaped outlet section and is free of a fire-resistant lining and the inlet section of the quenching pipe is a complementary skirt.

* * * * *